United States Patent
Pahlich

(10) Patent No.: US 9,926,982 B2
(45) Date of Patent: Mar. 27, 2018

(54) TORQUE TRANSMISSION DEVICE

(71) Applicant: Audi AG, Ingolstadt (DE)

(72) Inventor: Lutz Pahlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 374 days.

(21) Appl. No.: 14/404,567

(22) PCT Filed: May 24, 2013

(86) PCT No.: PCT/EP2013/001532
§ 371 (c)(1),
(2) Date: Nov. 28, 2014

(87) PCT Pub. No.: WO2013/178340
PCT Pub. Date: Dec. 5, 2013

(65) Prior Publication Data
US 2015/0147116 A1    May 28, 2015

(30) Foreign Application Priority Data

Jun. 1, 2012    (DE) .......................... 10 2012 010 792

(51) Int. Cl.
*F16B 3/04*    (2006.01)
*F16D 1/10*    (2006.01)
*F16D 3/02*    (2006.01)

(52) U.S. Cl.
CPC .................. *F16D 1/10* (2013.01); *F16D 3/02* (2013.01); *F16D 2001/103* (2013.01); *Y10T 403/7026* (2015.01)

(58) Field of Classification Search
CPC .. F16D 1/08; F16D 1/0805; F16B 3/00; F16B 3/04; Y10T 403/7018; Y10T 403/7021;
(Continued)

(56) References Cited

U.S. PATENT DOCUMENTS 1,645,342 A    10/1927    Moorhouse
2,271,266 A *    1/1942    Kost .................. F16B 9/023
                                                16/DIG. 24
(Continued)

FOREIGN PATENT DOCUMENTS

CN    1681697 A    10/2005    ............... B62D 1/20
DE    1 205 345    11/1965
(Continued)

OTHER PUBLICATIONS

Chinese Search Report dated Apr. 6, 2016 with respect to counterpart Chinese patent application 201380027877.3.
(Continued)

*Primary Examiner* — Michael P Ferguson
(74) *Attorney, Agent, or Firm* — Henry M. Feiereisen LLC

(57) ABSTRACT

A torque transmission device includes a shaft which has shaft teeth around its outer circumference, a hub which has hub teeth on an inner circumference, wherein the hub is arranged on the shaft in such a way that the shaft teeth and the hub teeth mesh with one another in order to transmit torque. The torque transmission device furthermore includes at least one spring element which passes entirely through the hub and is supported on the shaft and the hub and exerts a spring force on the hub and the shaft, wherein at least a component of the spring force is directed in such a way that around the entire circumference of the shaft and hub adjacent flanks of the shaft teeth and the hub teeth are pushed together.

1 Claim, 3 Drawing Sheets

(58) Field of Classification Search
CPC ......... Y10T 403/7022; Y10T 403/7033; Y10T 403/7035
See application file for complete search history.

(56) References Cited

U.S. PATENT DOCUMENTS

| | | | | |
|---|---|---|---|---|
| 2,697,621 | A | * 12/1954 | Frederick | F16B 2/248 384/538 |
| 3,056,618 | A | * 10/1962 | Andersen | F16B 21/16 403/354 |
| 3,164,402 | A | * 1/1965 | Jobe | F16D 1/0876 403/243 |
| 3,364,768 | A | 1/1968 | Powell | |
| 4,106,311 | A | 8/1978 | Euler | |
| 4,189,248 | A | * 2/1980 | Sully | F16D 1/08 16/433 |
| 4,406,641 | A | 9/1983 | Mallet | |
| 4,514,108 | A | * 4/1985 | Sagady | F16B 21/10 403/319 |
| 4,628,758 | A | * 12/1986 | Yuzuriha | B62D 1/20 403/14 |
| 5,807,180 | A | * 9/1998 | Knodle | F16D 1/0882 403/357 |
| 8,376,649 | B2 | * 2/2013 | Heinrich | F16D 1/0858 403/359.4 |
| 2001/0038772 | A1 | 11/2001 | Wormsbaecher | |

FOREIGN PATENT DOCUMENTS

| | | | |
|---|---|---|---|
| DE | 1205345 B | 11/1965 | ............... F16D 3/06 |
| DE | 1 550 701 | 7/1969 | |
| DE | 198 55 025 | 6/2000 | |
| DE | 102006017167 | 10/2007 | |
| GB | 2 061 458 | 5/1981 | |
| GB | 2 264 548 | 9/1993 | |
| GB | 2264548 A | 9/1993 | ............... F16D 3/18 |
| JP | 06-058341 | 3/1994 | |

OTHER PUBLICATIONS

Translation of Chinese Search Report dated Apr. 6, 2016 with respect to counterpart Chinese patent application 201380027877.3.
International Search Report issued by the European Patent Office in International Application PCT/EP2013/001532 dated Dec. 5, 2013.

* cited by examiner

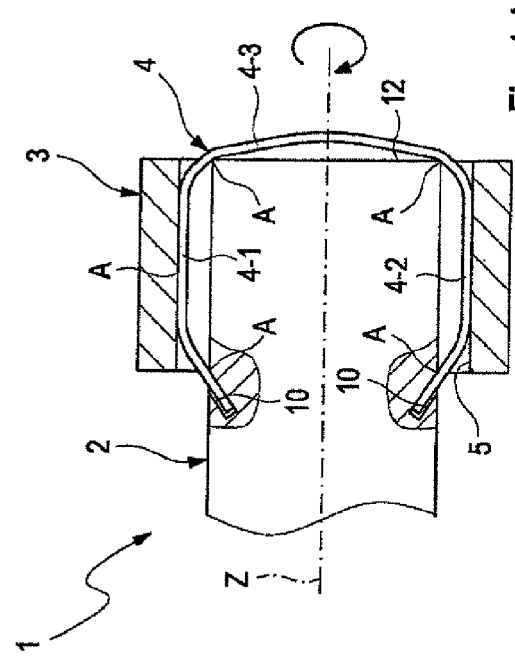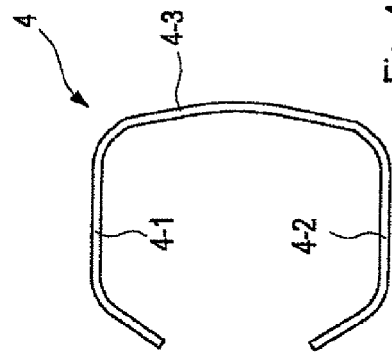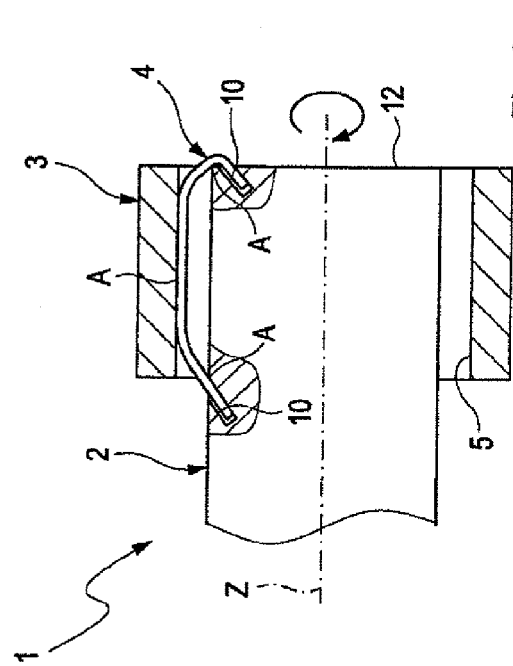

TORQUE TRANSMISSION DEVICE

CROSS-REFERENCES TO RELATED APPLICATIONS

This application is the U.S. National Stage of International Application No. PCT/EP2013/001532, filed May 24, 2013, which designated the United States and has been published as International Publication No. WO 2013/178340 and which claims the priority of German Patent Application, Serial No. 10 2012 010 792.7, filed Jun. 1, 2012, pursuant to 35 U.S.C. 119(a)-(d).

BACKGROUND OF THE INVENTION

The invention relates to a torque transmission device, in particular for a motor vehicle.

In motor vehicles it is required to transmit the torque produced by the drive engine to the drive wheels. This torque transmitting operative coupling is often referred to as drive train. Often, further components such as a clutch, a transmission, differentials and wheel housings are coupled to the drive engine on the output side. The transmission of torques between rotating bodies is often accomplished by using so called shaft-hub-connections, wherein materially bonding, form fitting or friction fitting force transmission mechanisms are used. A form fitting force transmission can for example be achieved by means of a reciprocal toothing of the shaft and the hub. In this case the shaft has toothings on its outer circumference and the hub has toothings on the inner circumference, which engage in each other.

A disadvantage of these toothings is that due to the radial tolerance required for mounting, they tend to produce noise in certain operating states, which adversely affects driving comfort. This may also lead to increased wear.

From DE 102006017167A1 braking elements for shaft-hub-connections are known, which partially engage in the toothing from outside. A disadvantage is here the complicated fastening of the braking elements on the shaft or hub.

From DE19855025A1 a suspension for a tooth clutch is known, which exerts a radial force onto the shaft and the hub in order to displace them out of their concentric position and to cause them to abut each other at two opposing sites.

SUMMARY OF THE INVENTION

An object of the present invention is to provide a torque transmission device which is characterized by a reduced noise development, a simple mounting and a cost effective construction.

This object is solved by the torque transmission device according to the independent claim. Advantageous embodiments of the torque transmission device are described in the dependent claims.

According to one aspect of the invention, a torque transmission device a shaft, which has a shaft toothing on its outer circumference, and a hub, which has a hub toothing on its inner circumference. The hub is arranged on the shaft so that the shaft toothing and the hub toothing engage in one another in order to transmit a torque. The torque transmission device further has at least one spring element which completely traverses the hub and is supported on the shaft and the hub and exerts a spring force on the hub and the shaft, wherein at least one component of the spring force is oriented so that adjacent flanks of the shaft toothing and the hub toothing are pressed against each other along the entire circumference of the shaft and the hub.

The invention is based on the idea to provide at least one spring element between the shaft and the hub, which is supported on the shaft and the hub and exerts a spring force on the shaft and the hub, which counteracts a rotation of the shaft and the hub relative to each other and thereby suppresses this rotation to the most degree. As a result of the component of the force, which acts over the entire circumference of the shaft and the hub and is oriented in circumferential direction, the relative position of the shaft and the hub is stabilized in the direction of rotation. The spring force has the effect that adjacent tooth flanks of the shaft toothing and the hub toothing come to rest against each other over the entire circumference of the shaft and the hub. For this purpose the spring element has support sites on the tooth flanks of the shaft toothing and/or the hub toothing. In this torque transmission device, relative radial movements caused by the tolerance between shaft and hub, and with this undesired noise development and wear, are effectively prevented. The spring element does not primarily serve the transmission of torques and is advantageously configured so that it fixes the shaft and the hub in rotational direction, but not in axial direction. For this, an axial compensatory movement between the shaft and the hub which may be required (for example due to manufacturing tolerances or temperature differences between the shaft and the hub) is still possible.

In an embodiment of the torque transmission device the hub toothing and/or the shaft toothing has at least one gap, wherein the spring element is arranged in the at least one gap.

The at least one gap of the corresponding toothing can be configured continuous in axial direction (i.e., in direction of the rotational axis of the shaft). In the simplest case the omission of one tooth is sufficient for the arrangement of the spring element. In the case of multiple spring elements corresponding gaps can be formed at any site of the toothing. Especially in the case of larger dimensioned spring elements this creates sufficient space and facilitates mounting.

In an embodiment of the torque transmission device the at least one spring element engages with its free ends behind the hub—in direction of the shaft rotational axis—on opposing front faces sides of the hub.

In this way the spring element can be securely positioned in axial direction, wherein a relative axial compensation of the shaft and the hub still remains possible.

In an embodiment of the torque transmission device at least one of the free ends of the spring element is fastened on an outside of the hub.

The fastening can occur on an outside of the hub, which faces away from the inner toothing. For this a recess, a bore or a radial protrusion can be formed on the outside of the hub, which is in form fitting engagement with the spring element. This enables an even better securing of the spring element.

In an embodiment of the torque transmission device the at least one spring element engages with at least one of its free ends behind the shaft on a front side of the shaft.

In an embodiment of the torque transmission device at least one of the free ends of the spring element is fastened on the shaft.

These embodiments of the torque transmission device represent alternative fastening options.

In an embodiment of the torque transmission device the spring element has two legs which—in circumferential direction of the shaft—are arranged at different positions, preferably opposing positions, between the shaft and the hub.

For this, the spring element can be substantially bent U-shaped, the legs extend preferably in the same direction. This embodiment of the spring may be a bent part made of spring wire, which can be produced easily and cost effectively.

In an embodiment of the torque transmission device the spring element covers or engages behind hub on its side which faces away from the legs on a front side of the hub at least in part.

In an embodiment of the torque transmission device, a free end of at least one leg can engage behind the hub on the opposing front side.

In an embodiment of the torque transmission device the spring element engages axially around the shaft, wherein a free end of at least one leg is fastened on the shaft.

This constitutes a further alternative fastening option of the spring element.

In this case according to an embodiment of the torque transmission device, the spring element can be configured so that a radially outwardly acting force acts on the two legs.

This embodiment enables easy mounting and securement in axial direction of the spring element. In particular the radially acting spring tension in connection with engagement of the free ends of the legs behind the front side of the hub result in a type of clip mechanism.

In a torque transmission device the at least one spring element is configured one-piece.

In particular the spring element can be an easily and cost-effectively producible part made of spring steel with a flat or round cross section.

BRIEF DESCRIPTION OF THE DRAWING

In the following, the invention is explained in more detail by way of exemplary embodiments with reference to the included figures. In the Figures

FIGS. 3A and 4A are schematic representations of two further embodiments of a torque transmission device;

FIGS. 3B and 4B are representations of two further embodiment of the spring element of the torque transmission device;

DETAILED DESCRIPTION OF PREFERRED EMBODIMENTS

Figure 1:
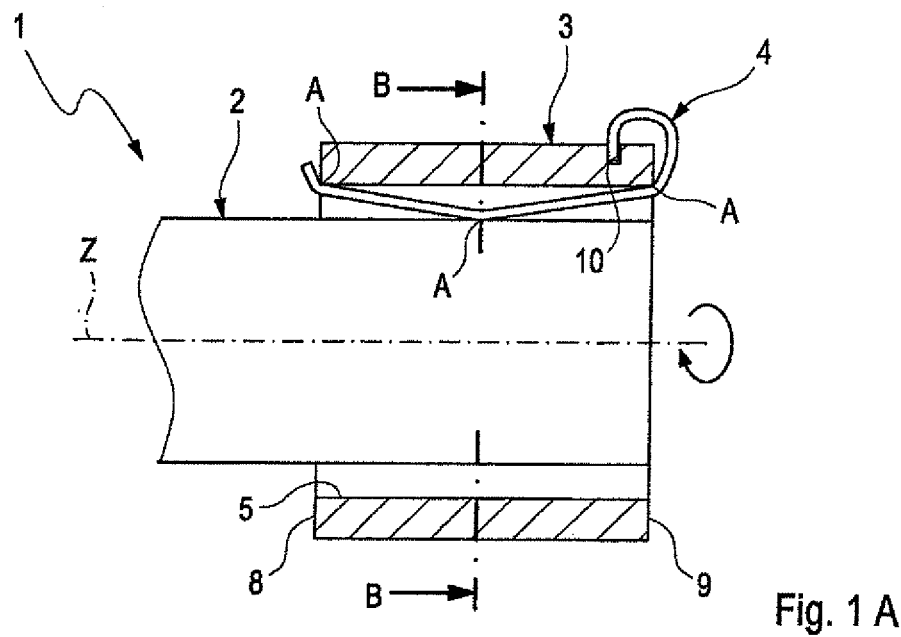
FIGS. 1A and 2A are schematic representations of two embodiments of a torque transmission device.
FIGS. 1B and 2B are schematic representations of two embodiments of the spring element of the torque transmission device.
FIGS. 1C and 2C are schematic cross sectional view of the torque transmission devices.
Figure 1:
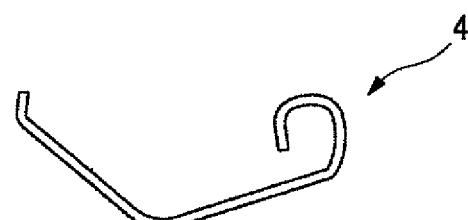
Figure 1:
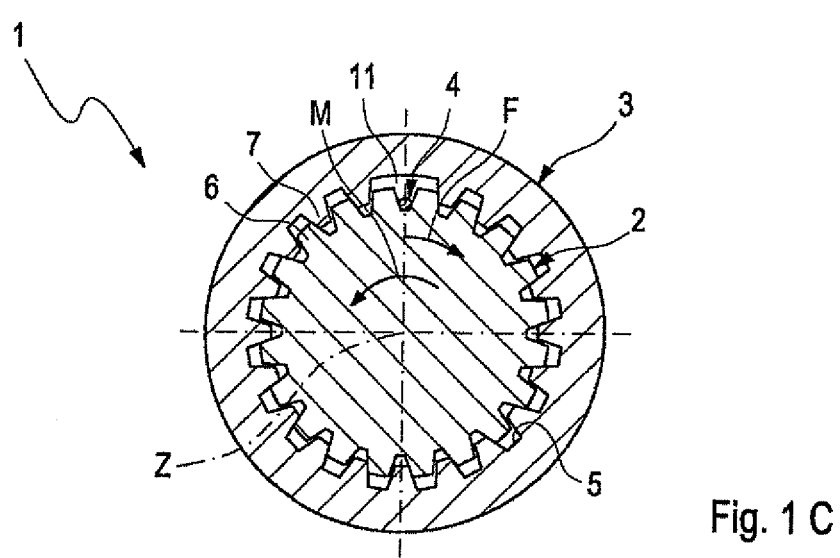
Figure 2:
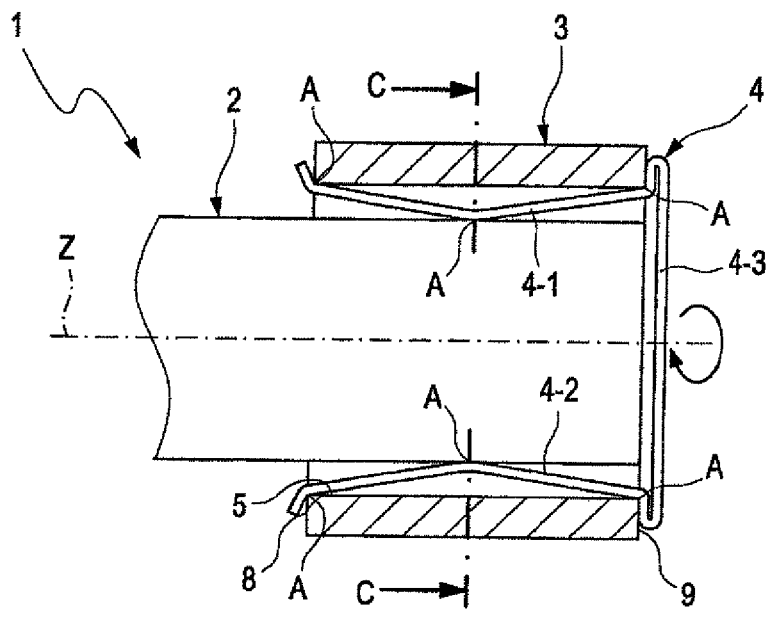
Figure 2:
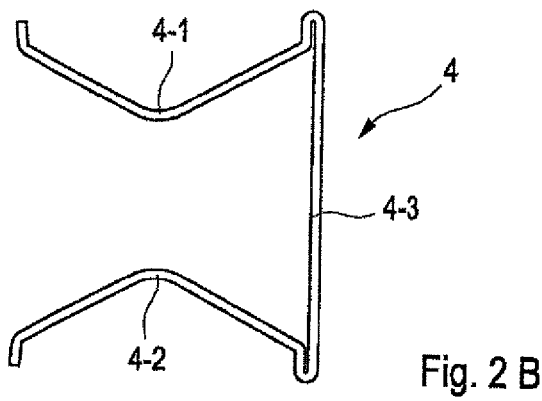
Figure 2:
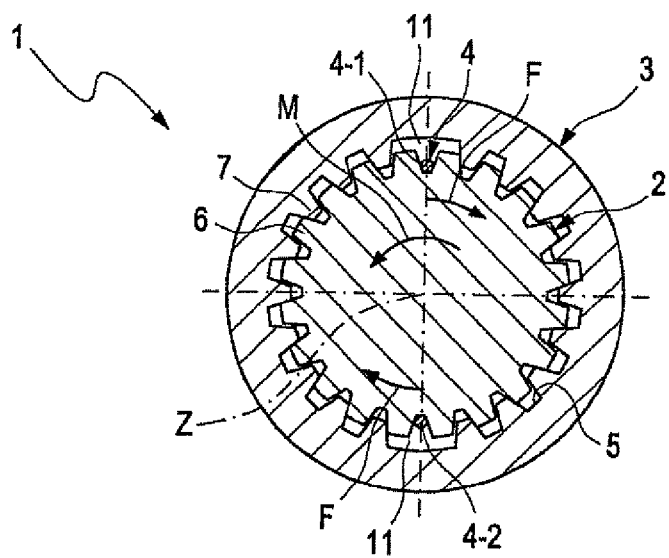

FIGS. 1A and 2A schematically show two exemplary embodiments of a torque transmission device 1. the torque transmission devices 1 have respectively a shaft 2 with the rotation axis Z, a hub 3 and a sprig element 4.

The exemplary embodiments of the FIGS. 1A, 1B and 1C differ from the exemplary embodiments of the FIGS. 2A, 2B and 2C only regarding the configuration of the respective spring element 4.

FIG. 1C or 2C are schematic cross sectional view of the torque transmission devices of FIG. 1A or 2A taken along the sectional lines B-B or C-C.

FIGS. 3A, 3B, 4A and 4B show two further exemplary embodiments of a torque transmission device. These differ only with regard to the type and shape of the used spring element.

As can be seen in FIGS. 1A, 2A and 1C, 2C, the hub 3 is arranged on the shaft 2. For this the hub 3 has a correspondingly dimensioned bore 5, with the shaft 2 being inserted with one end into the bore 5. In the exemplary embodiment the bore is a through bore. At least in the region of the mutual overlap of the shaft 2 and the hub 3, the shaft 3 has at its outer circumference a shaft toothing 6 and the hub 2 has at its inner circumference of the through bore 5 a hub toothing 7 (see FIGS. 1C and 2C). The shaft toothing 6 and the hub toothing 7 engage with each other for form fittingly transmitting a torque between each other (see FIGS. 1C and 2C).

FIGS. 1B and 2B show schematic embodiments of the spring element 4 in the free un-mounted state.

Both embodiments of the spring element 4 are configured one-piece and are advantageously made of spring-elastic material, for example spring steel. The spring elements 4 are cost-effectively producible with regard to the material as wells as manufacture. Any extrinsically effected change of shape, in particular a compression, extension or stretching of the spring element 4 causes a restoring force in the material of the spring element 4.

The embodiment of the spring element according to FIG. 1B has the shape of a multiply bent spring rod, wherein an additional increased bent or shaping is imposed on the respective opposing free ends. As will become apparent from FIG. 1A the special shaping serves for fastening of the spring element 4 on the hub.

The embodiment of the spring element 4 according to FIG. 2B has two legs 4-1, 4-2 with a common base 4-3. The main directions of extent of the legs 4-1, 4-2 are the same and point in the same direction (in FIG. 2B towards the left hand side).

The mounting, arrangement and function of the spring elements 4 are now explained by way of FIGS. 1A, 2A and 1C, 2C:

The spring elements 4 are mounted on the hub 3 prior to joining the shaft 2 and the hub 3.

In the embodiment of the spring element 4 according to FIG. 1B the spring element 4 is guided with a free end through the through bore 5 of the hub (see FIG. 1A). In the mounted state the spring element fully traverses the hub, wherein the spring element 4 is shaped so that it engages behind opposing front sides 8, 9 of the hub 3 (i.e., the free ends abut a front side 8, 9 of the hub 3). A free end of the spring element can in addition be fastened on an outer side of the hub 3 which faces away from the through bore 5. In the exemplary embodiment of FIG. 1A the bore 10 is arranged on the outside of the hub 3 into which the free end of the spring element 4 is inserted. However, other shapes are also conceivable in order to bring the free end in form fitting engagement with the hub.

Advantageously in the free state, i.e. in the relaxed state, the spring element 4 is shorter than the through bore, so that the spring element 4 has to be slightly stretched for the mounting. As a result of the stretching a spring tension is built up in the spring element 4 which in combination with the ends which engage behind, ensures a secure fit of the spring element 4 in the hub.

In the embodiment of the spring element 4 according to FIG. 2B, the spring element is guided with both free legs 4-1, 4-2 through the through bore 5 of the hub 3 so that the spring element 4 completely traverses the hub 4 (see FIG. 2A). The spring element 4 is configured so that in the mounted state the base 4-3 of the spring element 4 covers or engages behind the hub 3 on the front side 9 or the spring element rests against a front side 9 of the hub. The two free ends of the legs 4-1, 4-2 protrude out of the through bore 5 on the opposite side of the hub 3 and engage behind the hub 3 on the opposing front side 8 (i.e., they abut the front side of the hub 3).

Advantageously the spring element 4 according to the embodiment according to FIG. 2B is configured so that for the purpose of mounting in the hub 3 the two legs 4-1, 4-2 have to be pushed together. In particular the distance of the free ends of the legs 4-1, 4-2 is greater than the diameter of the through bore 5 of the hub 3. As a result the spring element 4 or the legs 4-1, 4-2 are radially outwardly pre-tensioned in the mounted state so that a radially outwardly acting force acts on the spring element 4. This results in a better fit of the spring element 4 in the hub 3.

After mounting the respective spring element 4 on the hub 3, the shaft 2 is pushed through the through bore 5 of the hub 3 so that the shaft toothing 6 and the hub toothing 7 come into engagement with each other. The spring element 4 is configured and dimensioned so that when introducing the shaft 2 in to the bore 5 of the hub the spring element 4—more precisely the section inside the spring element situated in the through bore 5, is pushed radially outwardly. In the completely mounted state of the torque transmission device 1 the spring element 4 is arranged between the shaft 2 and the hub 3 and is supported on the support sites A on the shaft 2 and on the hub 3. As a result of the deformation of the spring element 4 during insertion of the shaft 2 into the hub 3 a restoring material tension and spring force is established.

As can be recognized in FIGS. 1C and 2C, the spring element 4 is supported on the flanks of adjacent teeth of the shaft toothing. As mentioned above the compression of the spring element 4 during the insertion of the shaft 2 into the through opening of the hub 3 causes a restoring material tension and spring force F. As a result of this arrangement at least one component of the spring force F is oriented in a circumferential direction or rotation direction of the shaft 2, i.e., tangentially to the shaft 2 or the hub 3, and causes the flanks of the shaft toothing 6 and hub toothing 7 to be pushed together over the entire circumference. The force F or the corresponding component, acts over the entire circumference of the shaft 2 and hub 3 and is oriented tangentially to the shaft and hub over the entire circumference. The spring force F thus acts over the entire circumference of shaft 2 and hub 3 against a possible relative rotation movement M of the shaft 2 and the hub 3. As a result the position of the shaft 2 and hub 3 relative to each other is fixed or stabilized and a striking of the flanks of the shaft toothing 6 and hub toothing against each other is at least significantly reduced.

Even though only one spring element 4 is used in the embodiment according to FIG. 1B multiple spring elements 4 can also be arranged at different angular positions in circumferential direction of the shaft 2 and hub 3. This makes it possible that the relative position between shaft and 2 and hub 3 can be further stabilized and a manufacture-related tolerance in the toothing can be compensated.

For a simple mounting of the spring element 4 at least one gap 11 can be formed in the hub toothing 7 and/or the shaft toothing 6. For this purpose for example a tooth may be omitted in the hub toothing 7 and/or the shaft toothing 6.

A further advantage of the present invention is that even though the radial tolerance in the toothing 6, 7 of shaft 2 and hub 3 is reduced or eliminated (relative to the rotation axis Z of the shaft) an axial compensation still remains possible. Further, for the mounting of the torque transmission device, a relative alignment of shaft 2 and hub 3 in rotation direction is not required, i.e., the shaft 2 and hub 3 can be inserted into each other in any desired angular position (relative to the rotation axis).

FIGS. 3A, 3B, 4A and 4B show alternative embodiments of the torque transmission device 1. The differences reside in the shape and fastening of the spring element 4 and in the mounting of the torque transmission device 1. The principle functioning and the resulting advantages are identical to the ones of the exemplary embodiments of FIGS. 1A, 1B and 2A, 2B, 2C or are appreciated by a person with skill in the art analogously. In the following only the differences are explained. Same elements are provided with the same reference numerals.

For mounting of the exemplary embodiments of the torque transmission device 1 according to FIGS. 3A and 4A, the corresponding spring elements 4 (see FIGS. 3b and 4B) are first arranged on the respective shaft 2.

When using the spring element according to FIG. 3B its free ends are inserted into correspondingly configured indentations 10 of the shaft 2, so that a form fitting connection of the shaft 2 results and the spring element 4 is securely fastened on the shaft 2. Advantageously the spring element 4 is dimensioned so that it has to be slightly stretched for the mounting on the shaft, thus resulting in a pre-tension that additionally supports the fastening. In the fastened state at least one free end of the spring element 4 engages behind the shaft 2 on a front side 10. However, it is also possible that both free ends of the spring element 4 engage behind the shaft 2 on opposing front sides.

When using a spring element according to FIG. 4B the spring element is inserted with the free ends into correspondingly configured indentations 10 on opposing outer sides of the shaft 2 so that a form fitting connection with the shaft 2 results and the spring element 4 is securely fastened on the shaft 2. Advantageously the spring element 4 is dimensioned so that the two legs 4-1, 4-2 have to be slightly pushed apart for the mounting so that additionally a pre-tension results which supports the fastening. In the fastened state the spring element 4 engages around the shaft 2 with the legs 4-1, 4-2 and the base 4-3 on a front side 10 and the outer sides.

Subsequently in both exemplary embodiments, the hub 3 is pushed over the shaft 2 with the spring element 4 mounted thereon. The spring elements 4 are dimensioned and configured so as to be slightly compressed along their longitudinal extent and are supported on the shaft 2 and the hub 3 on the support sites A. This results in a pre-tension in the spring element 4, which securely fixes the spring element between the shaft 2 and the hub 3. At the same time this material tension generates a spring force F (analogous to FIGS. 1C and 2C), which counteracts a rotation of the shaft and the hub relative to each other. In contrast to the exemplary embodiments of FIGS. 1A, 1B, 1C and 2A, 2B, 2C the spring element is supported on the flanks of adjacent teeth of the hub toothing 7.

What is claimed is:
1. A torque transmission device, comprising:
a shaft having an outer circumference provided with a shaft toothing adjacent a distal end surface of the shaft;
a hub comprising a bore extending between opposing end faces of the hub, said bore having an inner circumference provided with a hub toothing, said hub being arranged on the shaft so that the shaft toothing and the hub toothing engage one another to transmit a torque,
wherein one of the hub toothing and the shaft toothing comprises a pair of opposing gaps defined between respective adjacent teeth thereof, adjacent teeth of the other of the hub toothing and shaft toothing being arranged within each said gap; and a spring element having two legs formed as one-piece with a base of the spring element and forming bent abutment portions therebetween disposed at opposing ends of the base, said legs being arranged at opposing positions between the shaft and the hub, each said leg being arranged within one of said gaps and disposed between said adjacent teeth of the other of the hub toothing and shaft toothing, each said leg having at least one support site on tooth flanks of the other of the shaft toothing and the hub toothing, said spring element completely traversing the hub between said opposing end faces of the hub and being supported on the shaft and the hub, wherein the base extends across said distal end surface of the shaft and said abutment portions abut one of said end faces of the hub, and outwardly bent free ends of said legs abut the other said opposing end face of the hub to exert a spring force on the hub, and wherein a bending angle of each said leg is defined by an inwardly extending bent portion of said leg abutting the shaft to exert a spring force on the shaft, and at least one component of the spring force is oriented so that adjacent flanks of the shaft toothing and the hub toothing are pushed against each other over an entire circumference of the shaft and hub.

\* \* \* \* \*